United States Patent
Silva et al.

(10) Patent No.: US 12,535,616 B1
(45) Date of Patent: Jan. 27, 2026

(54) DEGRADABLE DEVICE FOR DOWNHOLE EVALUATION

(71) Applicant: Royal Completion Tools, LLC, Houston, TX (US)

(72) Inventors: Zachary Silva, Pinehurst, TX (US); Elias Pena, Katy, TX (US)

(73) Assignee: Royal Completion Tools, LLC, Houston, TX (US)

( * ) Notice: Subject to any disclaimer, the term of this patent is extended or adjusted under 35 U.S.C. 154(b) by 0 days.

(21) Appl. No.: 19/283,217

(22) Filed: Jul. 28, 2025

Related U.S. Application Data

(60) Provisional application No. 63/676,005, filed on Jul. 26, 2024.

(51) Int. Cl.
*G01V 9/00* (2006.01)

(52) U.S. Cl.
CPC .................................... *G01V 9/00* (2013.01)

(58) Field of Classification Search
CPC .......... G01N 33/24; G01N 33/20; G01N 1/00; G01N 30/00; G01V 9/00; G01V 1/50
See application file for complete search history.

(56) References Cited

U.S. PATENT DOCUMENTS

| | | | |
|---|---|---|---|
| 10,526,868 B2 * | 1/2020 | Walton | E21B 33/134 |
| 2014/0196899 A1 * | 7/2014 | Jordan | C22C 32/00 |
| | | | 427/314 |
| 2017/0234103 A1 * | 8/2017 | Frazier | E21B 33/1291 |
| | | | 166/138 |

\* cited by examiner

*Primary Examiner* — Tarun Sinha
(74) *Attorney, Agent, or Firm* — Compass IP Law PC

(57) ABSTRACT

A wellbore apparatus includes a carrier apparatus to deploy downhole in a wellbore. The carrier apparatus includes multiple coupons of different degradable materials housed in the carrier. The multiple coupons degrade at different rates based on the difference in materials. The difference in degradation rates indicates specific performance of the material composition in the wellbore environment.

20 Claims, 6 Drawing Sheets

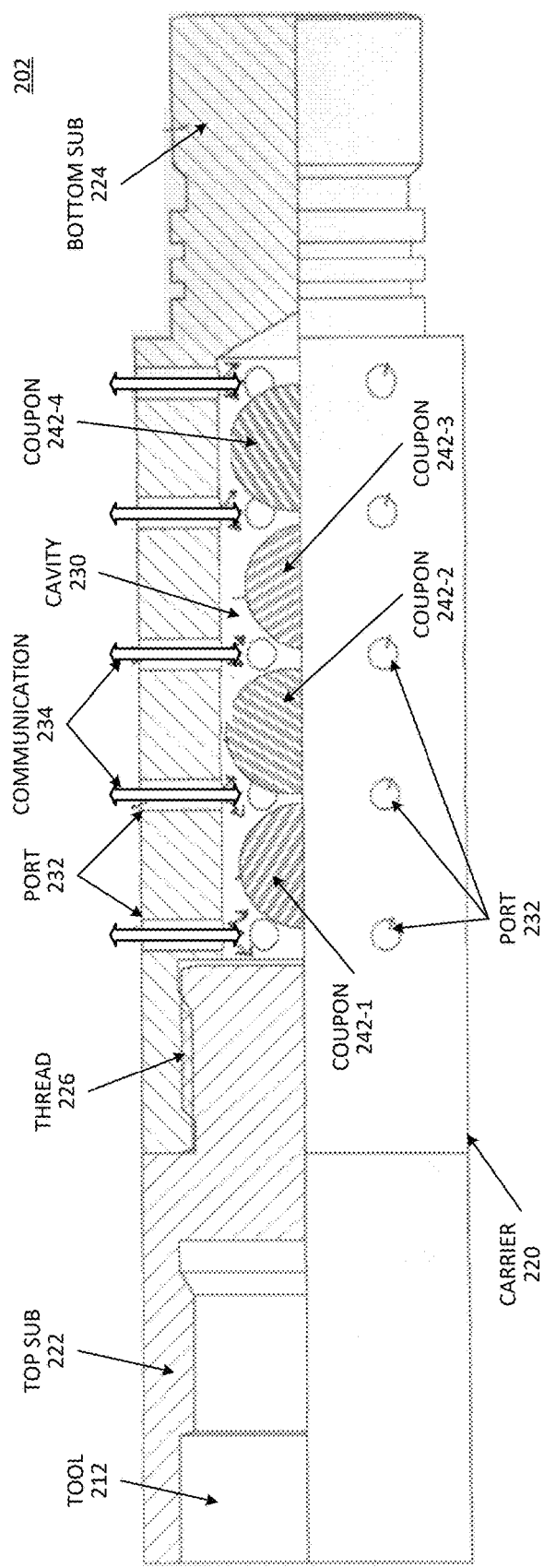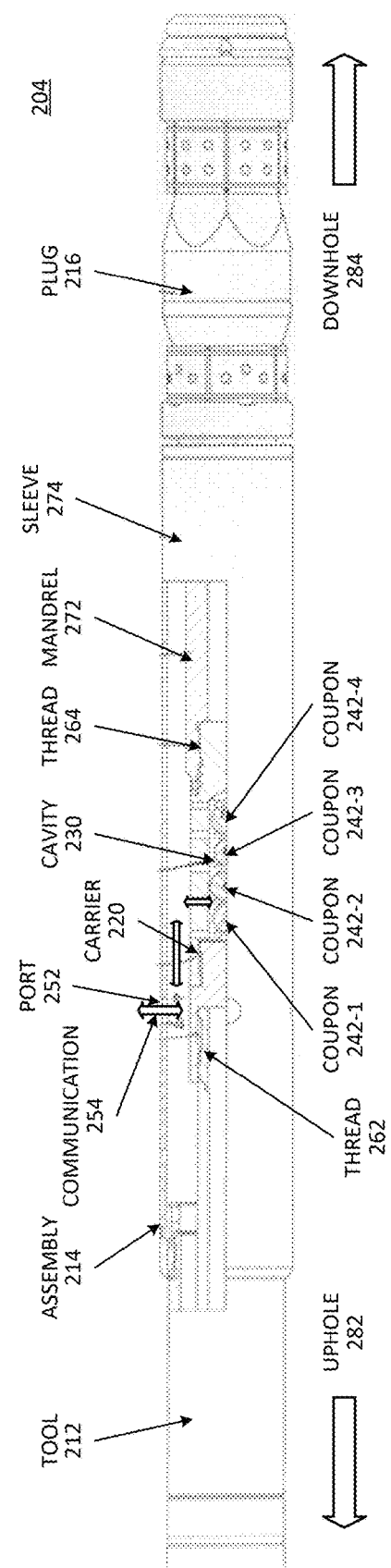

DEGRADABLE DEVICE FOR DOWNHOLE EVALUATION

PRIORITY

This application is a nonprovisional based on, and claims the benefit of priority of, U.S. Provisional Application No. 63/676,005, filed Jul. 26, 2024.

TECHNICAL FIELD

Descriptions are generally related to oil and gas well completions, and more particular descriptions are related to deployment and recovery of degradable devices.

BACKGROUND OF THE INVENTION

Current unconventional completion operations in the oil and gas industry have seen a growing utilization of degradable equipment, primarily in the form of degradable frac plugs, for specialized applications that have historically posed operational risks for traditional completion equipment. Examples of specialized applications include difficult millout operations as a result of casing damage or relatively low bottom hole pressure. While degradable equipment significantly reduces the risk of coil tubing and milling issues over a conventional frac plug in such applications, the use of degradable material is not without its own risks. Degradable equipment is made of material that is highly reliant on chemistry of the wellbore fluid.

In standard oil and gas operations, wellbore fluid is analyzed in advance of the completion, typically in an offsite facility, to determine the best material selection with respect to degradation targets determined by the application. As such, the material selection alone must be tailored to the specific well. Without performing the analysis, there is a potential for highly volatile degradation rates, or lack of complete degradation of the selected material. The risk of improper material degradation is further compounded with the fact that wellbore fluid chemistry may not be consistent over the duration of the completion operation. Rather, considerable changes in chemistry can occur that would drastically alter the dissolution reaction of the selected degradable material. Failure to match the material selection to the wellbore chemistry can result in a failed stage and cost the customer down time and lost production revenue.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 2A is an example of a downhole carrier apparatus with a single cavity having multiple degradable coupons.

FIG. 2B is an example of a downhole carrier apparatus subassembly, with the single cavity carrier.

Descriptions of certain details and implementations follow, including non-limiting descriptions of the figures, which may depict some or all examples, and well as other potential implementations.

DETAILED DESCRIPTION OF THE INVENTION

As described herein, a wellbore apparatus includes a carrier apparatus to deploy downhole in a wellbore. The carrier apparatus includes multiple coupons of different degradable materials housed in the carrier. The multiple coupons degrade at different rates based on the difference in materials. The difference in degradation rates indicates specific performance of the material composition in the wellbore environment.

Figure 1:
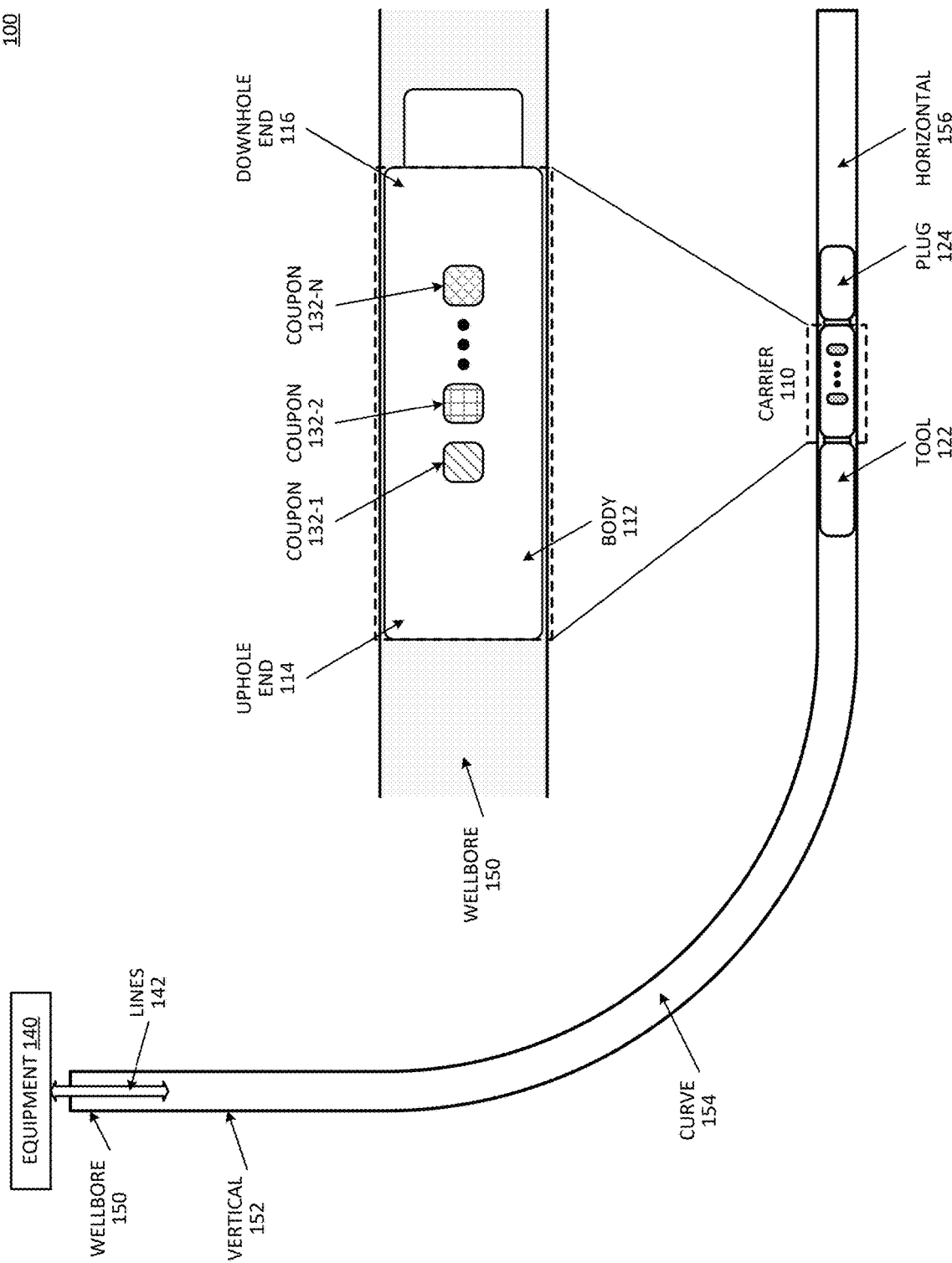
FIG. 1 is an example of a wellbore with a downhole carrier apparatus.

FIG. 1 is an example of a wellbore with a downhole carrier apparatus. System 100 illustrates a downhole carrier coupled to a setting tool and a fracturing plug, such as a fracturing plug assembly. System 100 illustrates wellbore 150, which includes the vertical portion vertical 152, the curved portion curve 154, and the horizontal portion horizontal 156.

The well can be drilled vertically to a known depth, resulting in vertical 152, then curved and drilled to a known horizontal position, resulting in curve 154. Once at the horizontal depth, the drilling can continue, resulting in horizontal 156. Equipment 140 represents the surface equipment used to deploy and control the wellbore equipment. Lines 142 represent the lines used to set and manage the downhole equipment. For example, lines 142 can be or include wireline conveyance equipment to deploy the carrier downhole.

In one example, system 100 includes tool 122, which represents a setting or retrieving tool deployed downhole. System 100 also illustrates plug 124, which represents a component or equipment that is set downhole in wellbore 150. Wellbore 150, at the target depth where plug 124 will be set, has a specific chemistry due to the liquid, gases, dissolvables, and other materials at the depth.

In one example, system 100 includes carrier 110 coupled to tool 122 and to plug 124. Carrier 110 represents an carrier apparatus that can carry multiple degradable coupons downhole when tool 122 is deployed downhole. In one example, carrier 110 is an attachment to the downhole assembly. In one example, carrier is integrated into or onto the body of a piece of downhole assembly equipment. Thus, for example, the downhole setting equipment can perform setting while also gathering information about the downhole environment.

Carrier 110 has body 112, where the details of the body are not illustrated or specified in system 100. In general, there are no restrictions on the composition and form of body 112, as long as it accommodates multiple degradable coupons in accordance with any example described below. Body 112 can be made from metal, composite, ceramic, elastomer, wood, plastic, glass, or other material, or a combination of any of these materials. Body 112 can have multiple component parts, which can be made of any one or more of these materials.

Body 112 has uphole end 114, referring to a portion of carrier 110 that is closest to the surface when the carrier is deployed in the wellbore. Body 112 also has downhole end 116, referring to a portion of carrier 110 that is furthest from the surface when the carrier is deployed in the wellbore. The uphole and downhole ends can be configured differently for different coupling equipment to connect to other components of an assembly.

Carrier 110 houses N coupons, coupon 132-1, coupon 132-2, . . . , coupon 132-N, where N is an integer greater than 1. The N coupons can collectively be referred to as coupons 132. Coupon 132-1 has a different composition from coupon 132-2, which in turn has a different composition from another coupon, and so forth until coupon 132-N. The differences in coupon composition cause the coupons to degrade at different rates in the wellbore environment of wellbore 150.

While system 100 illustrates N coupons each having a different composition, there is no restriction on deploying multiple coupons having the same composition, for example, deploying two or more coupons of the same composition with one or more coupons of different composition. However, it will be understood that generally the system will gather more information about the wellbore environment when each coupon has a different composition. Descriptions of gathering information about the wellbore environment may be more specifically stated to say they are gathering information about how different compositions react to a given wellbore environment.

Rather than sampling the wellbore once prior to deployment, and then lacking additional feedback about the wellbore environment, including changes in the environment, carrier 110 can be deployed with every downhole deployment. When setting equipment is returned to the surface, analysis of the degradation of the various coupons provides useful information about rates of degradation of various compositions, enabling more accurate matching of materials for dissolvable plugs or other dissolvable equipment.

System 100 does not specifically illustrate environment communication, which refers to an opening or port that exposes coupons 132 to the materials in the wellbore, but subjecting coupons 132 to the wellbore environment with environment communication subjects the coupons to dissolution/degradation of their degradable material. Loss of volume of affected degradable test coupons resulting from exposure to the wellbore environment can be determined at the surface after removing coupons 132 from the carrier apparatus. Events such as full dissolution, or volume change to the point that the remaining portion of the affected degradable test coupon is about to fall out of an access port, serve as significant dissolution indicators even though test coupons that do not return to surface cannot be analyzed.

As indicated above, coupons 132 can be made of different materials. Reference to being made of different materials can refer to the use of entirely different materials, as well as referring to different compositions of a material. In one example, one or more of coupons 132 is made from a magnesium alloy. In one example, one or more of coupons 132 is made from a composition of polyglycolic acid (PGA). In one example, one or more of coupons 132 is made from a composition of polylactic acid (PLA). In one example, coupons 132 are made from different compositions of magnesium alloy. In one example, coupons 132 are made from different compositions of PGA. In one example, coupons 132 are made from different compositions of PLA. In one example, coupons 132 include composite materials made from at least one of the above with one or more other materials (which could another material indicated above).

FIG. 2A is an example of a downhole carrier apparatus with a single cavity having multiple degradable coupons. System 202 represents components of a downhole assembly in accordance with an example of system 100. System 202 specifically illustrates a single cavity carrier apparatus, carrier 220. Carrier 220 can convey degradable test coupons into and out of a wellbore environment.

Carrier 220 is specifically illustrated as housing four degradable coupons, coupon 242-1, coupon 242-2, coupon 242-3, and coupon 242-4, collectively, coupons 242. Carrier 220 represents a single cavity carrier apparatus having top sub 222 and bottom sub 224, which connect at a thread connection, represented by thread 226, to form an enclosed carrier volume. The enclosed volume is represented by cavity 230, which is a common cavity or open internal space for all of coupons 242.

In one example, the body of bottom sub 224 has multiple access ports, represented by ports 232. It will be understood that system 202 includes more ports than are pointed to by the arrows. Ports 232 allow environmental communication (communication 234) between the enclosed carrier volume and the wellbore environment. The wellbore environment is able to communicate both in to and out of the enclosed carrier volume formed by top sub 222 and bottom sub 224.

In one example, top sub 222 is connected to tool 212, which represents a component of an assembly (also used synonymously with subassembly) to which carrier 220 can be connected to be deployed downhole and retrieved from the downhole position. Carrier 220 houses coupons 242, enabling the gathering of information about the downhole wellbore environment.

In one example, cavity 230 represents a single cavity having multiple coupons that have different materials or different compositions, or both different materials and different compositions in a single chamber. It will be understood that cavity 230 is a single chamber internal to carrier 220.

FIG. 2B is an example of a downhole carrier apparatus subassembly, with the single cavity carrier of system 202. More specifically, system 204 represents components of a downhole subassembly including carrier 220.

In one example, system 204 represents a wireline adapter kit subassembly, represented by assembly 214, utilized in coupling a downhole fracturing plug, represented by plug 216, and downhole setting tool, represented by tool 212. In one example, carrier 220 connects to a tension mandrel, represented by mandrel 272, by thread 264 on the downhole end (e.g., at downhole 284). In one example, carrier 220 connects to tool 212 by thread 262 on the uphole end (e.g., at uphole 282).

In one example, carrier 220 and mandrel 272 form a subassembly concentrically enclosed by a setting sleeve, represented by sleeve 274. In one example, sleeve 274 includes multiple ports, represented by port 252, located around the setting sleeve, forming a second environment communication, represented by communication 254, that allows access to access ports 232 and communication 234 within the carrier volume.

Cavity 230, which represents the internal carrier volume, houses coupons 242. In one example, the wireline adapter kit subassembly (e.g., assembly 214) can convey carrier 220 downhole to a setting depth for plug 216. Once the fracturing (frac) plug is set and released from assembly 214, carrier 220 and the rest of the bottom hole assembly is conveyed uphole and removed from the wellbore. Someone can analyze the degradation of coupons 242 at the surface and determine a specific composition to use for degradable equipment to be used downhole.

Figure 3A:
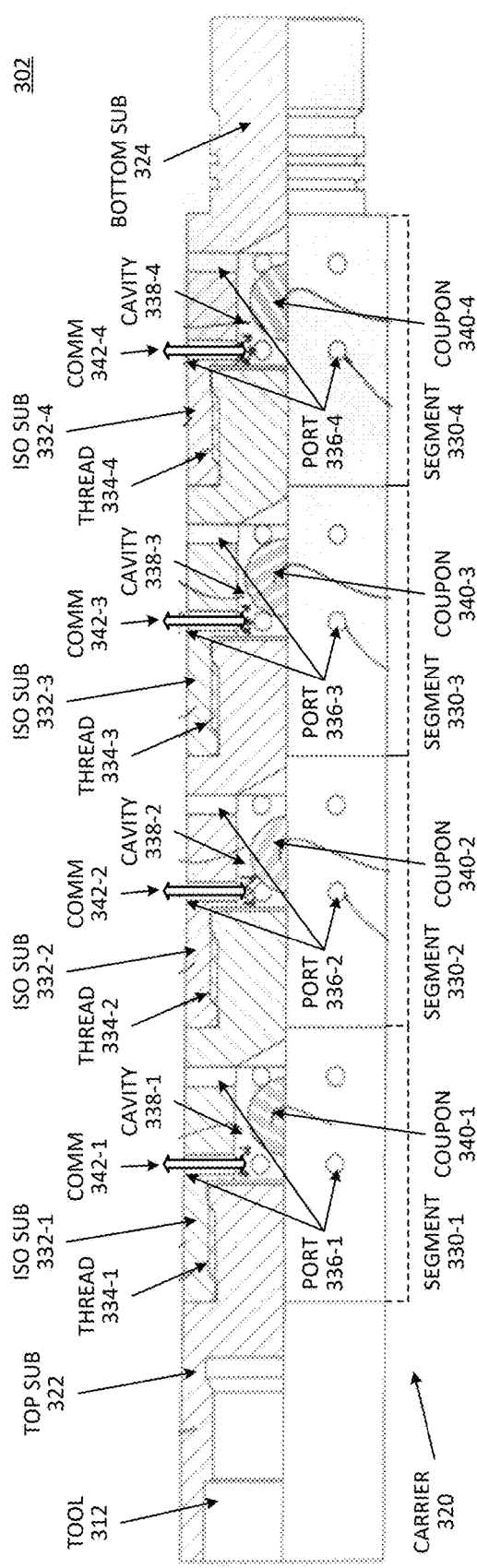
FIG. 3A is an example of a downhole carrier apparatus with multiple cavities.

FIG. 3A is an example of a downhole carrier apparatus with multiple cavities. System 302 represents components of a downhole assembly in accordance with an example of system 100. System 302 specifically illustrates a multiple cavity carrier apparatus, carrier 320. Carrier 320 can convey degradable test coupons into and out of a wellbore environment.

Carrier 320 is specifically illustrated as housing four degradable coupons, coupon 340-1, coupon 340-2, coupon 340-3, and coupon 340-4, collectively, coupons 340, in separate isolated chambers. Segment 330-1, segment 330-2, segment 330-3, and segment 330-4, collectively, segments 330, correspond respectively to coupon 340-1, coupon 340-2, coupon 340-3, and coupon 340-4.

Each segment has a separate isolated internal chamber for a separate coupon. The isolated internal chamber is formed by the separate isolated subs (iso subs) of each individual segment, with iso sub 332-1, iso sub 332-2, iso sub 332-3, and iso sub 332-4, collectively iso subs 332, corresponding to segment 330-1, segment 330-2, segment 330-3, and segment 330-4, respectively.

Carrier 320 represents a multiple cavity carrier apparatus having top sub 322, bottom sub 324, and iso subs 332. Each segment connects to the next downhole segment with a thread connection. As illustrated, thread 334-1 connects iso sub 332-1 to top sub 322, thread 334-2 connects iso sub 332-2 to iso sub-332-1, thread 334-3 connects iso sub 332-3 to iso sub 332-2, and thread 334-4 connects iso sub 332-4 to iso sub 332-3. In one example, bottom sub 324 is connected to or part of iso sub 332-4. Each connection forms a separate enclosed volume, represented by cavity 338-1 for coupon 340-1, cavity 338-2 for coupon 340-2, cavity 338-3 for coupon 340-3, and cavity 338-4 for coupon 340-4. The cavities can be referred to collectively as cavities 338, with each cavity being an isolated cavity or isolated open internal space for separate coupons 340.

In one example, the body of each separate segment has multiple access ports, represented by port 336-1 for iso sub 332-1, port 336-2 for iso sub 332-2, port 336-3 for iso sub 332-3, and port 336-4 for iso sub 332-4. The ports can be referred to collectively as ports 336. It will be understood that system 302 includes more ports than are pointed to by the arrows. Ports 336 allow environmental communication between the enclosed carrier volumes and the wellbore environment. The wellbore environment is able to communicate both in to and out of the enclosed carrier volumes. The environmental communication is illustrated for each segment as comm (communication) 342-1 for coupon 340-1, comm 342-2 for coupon 340-2, comm 342-3 for coupon 340-3, and comm 342-4 for coupon 340-4.

In one example, top sub 322 is connected to tool 312, which represents a component of an assembly (also used synonymously with subassembly) to which carrier 320 can be connected to be deployed downhole and retrieved from the downhole position. Carrier 320 houses coupons 340, enabling the gathering of information about the downhole wellbore environment.

In one example, each of the multiple cavities, cavities 338, represents a single cavity having a single coupon, allowing carrier 320 to house degradable test coupons without the comingling of degradable coupons. Carrier 320 can provide a multiple carrier structure to house coupons 340 that have different materials or different compositions, or both different materials and different compositions in a single chamber. Each separate chamber can house a coupon of different degradable material or composition.

Figure 3B:
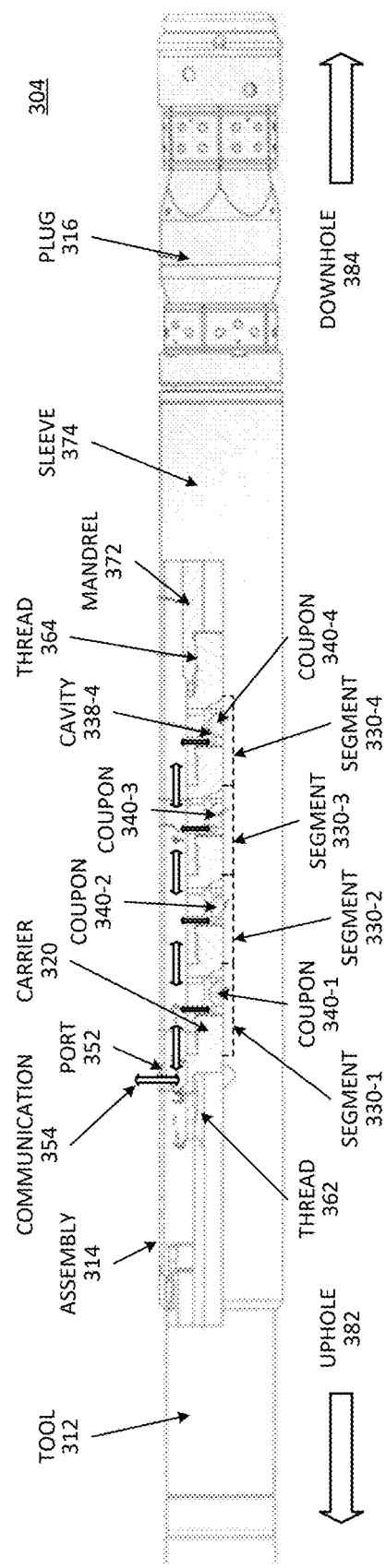
FIG. 3B is an example of a downhole carrier apparatus subassembly, with the multiple cavity carrier.

FIG. 3B is an example of a downhole carrier apparatus subassembly, with the multiple cavity carrier of system 302. More specifically, system 304 represents components of a downhole subassembly including carrier 320.

In one example, system 304 represents a wireline adapter kit subassembly, represented by assembly 314, utilized in coupling a downhole fracturing plug, represented by plug 316, and downhole setting tool, represented by tool 312. In one example, carrier 320 connects to a tension mandrel, represented by mandrel 372, by thread 364 on the downhole end (e.g., at downhole 384). In one example, carrier 320 connects to tool 312 by thread 362 on the uphole end (e.g., at uphole 382).

In one example, carrier 320 and mandrel 372 form a subassembly concentrically enclosed by a setting sleeve, represented by sleeve 374. In one example, sleeve 374 includes multiple ports, represented by port 352, located around the setting sleeve, forming a second environment communication, represented by communication 354, that allows access to access ports 336 and comm 342 within the carrier volume.

Cavities 338, which represent the internal carrier volumes, house coupons 340. In one example, the wireline adapter kit subassembly (e.g., assembly 314) can convey carrier 320 downhole to a setting depth for plug 316. Once the fracturing (frac) plug is set and released from assembly 314, carrier 320 and the rest of the bottom hole assembly is conveyed uphole and removed from the wellbore. Someone can analyze the degradation of coupons 340 at the surface and determine a specific composition to use for degradable equipment to be used downhole.

Figure 4:
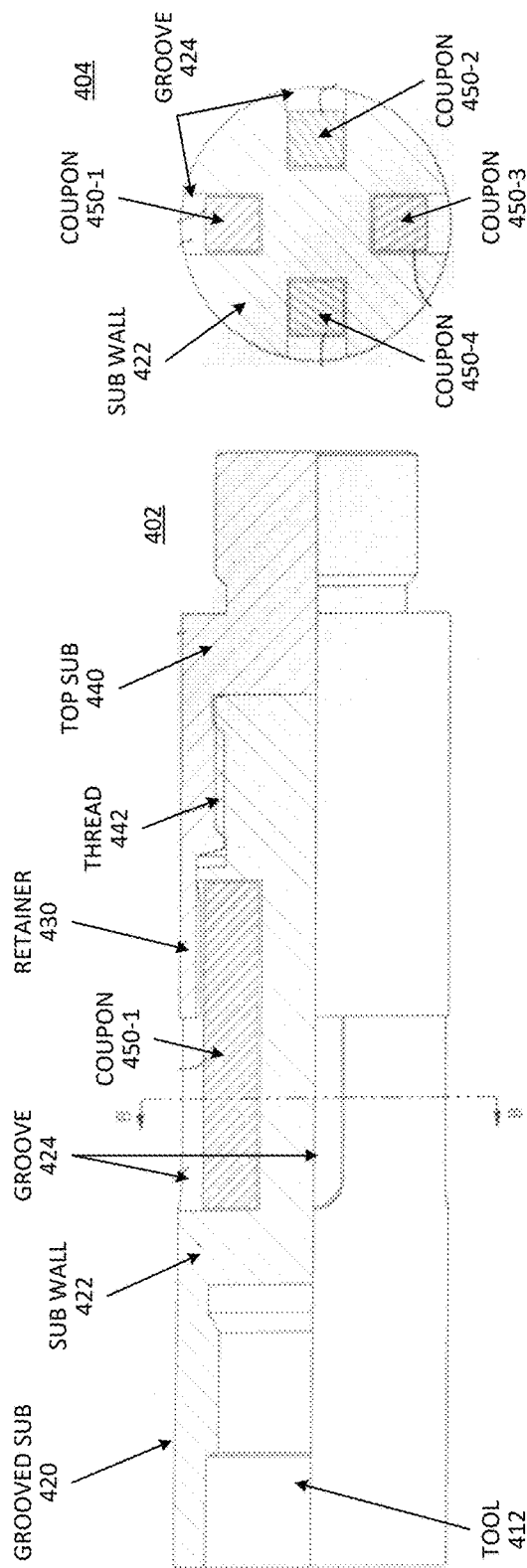
FIG. 4 is an example of a downhole carrier apparatus subassembly having multiple degradable coupons held externally.

FIG. 4 is an example of a downhole carrier apparatus subassembly having multiple degradable coupons held externally. System 402 represents a carrier apparatus in accordance with an example of system 100. More specifically, system 402 illustrates a carrier apparatus with external grooves to convey degradable test coupons.

System 402 includes grooved sub 420, which represents the body of a carrier apparatus. Grooved sub 420 includes grooves 424 around an outside of sub wall 422. With separate grooves 424, system 402 can convey degradable coupons in separate grooves in to and out of wellbore environments. Grooved sub 420 can be connected to tool 412 for sending downhole in a wellbore and for retrieving it from the wellbore.

The grooved carrier apparatus includes top sub 440, which can be a top sub of another component of a downhole assembly, and grooved sub 420. Grooved sub 420 can have carrier grooves, represented by grooves 424, sub wall 422, which represents the wall of the grooved sub, and retainer 430. In one example, top sub 440 is connected to grooved sub 420 by a thread connection, represented by thread 442. Retainer 430 is positioned concentrically about grooved sub 420 and holds the degradable test coupons within the carrier grooves while the external groove carrier apparatus is conveyed throughout a wellbore environment.

In the view of system 402, coupon 450-1 is visible within groove 424 and held by retainer 430. Groove 424 represents external grooves in the exterior of the carrier apparatus. Grooves 424 represent an example of separate chambers in exterior cavities of the carrier.

View 404 represents a cross-section looking back at arrows B, which does not show retainer 430. In view 404, coupon 450-1, coupon 450-2, coupon 450-3, and coupon 450-4, collectively coupons 450, are visible arranged concentrically around the carrier apparatus, disposed in carrier grooves 424 in sub wall 422. Coupons 450 are exposed to wellbore environment when housed in grooves 424, which are open to the wellbore environment.

Figure 5:
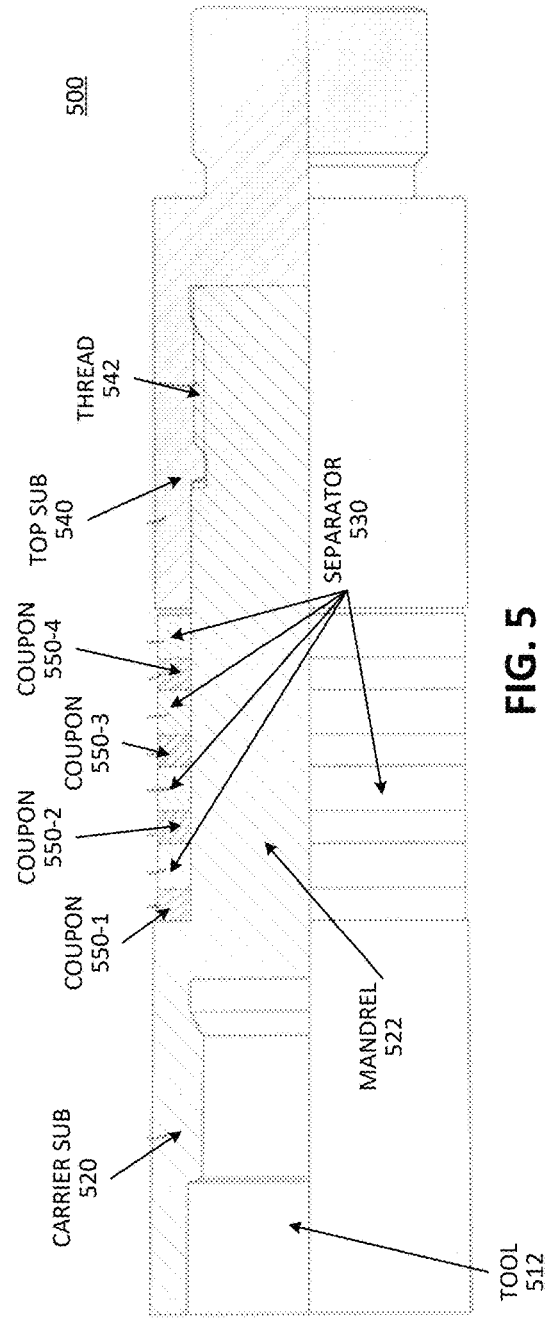
FIG. 5 is an example of a downhole carrier apparatus subassembly having concentric ring degradable coupons.

FIG. 5 is an example of a downhole carrier apparatus subassembly having concentric ring degradable coupons. System 500 represents a carrier apparatus in accordance with an example of system 100. More specifically, system 500 illustrates a carrier apparatus with external grooves for concentric rings to convey degradable test coupons.

System 500 includes carrier sub 520, which represents the body of a carrier apparatus. Carrier sub 520 includes grooves or location for concentric rings around an outside of the sub wall. With separate grooves 524, system 500 can convey degradable coupons in separate grooves in to and out of wellbore environments. Carrier sub 520 can be connected to tool 512 for sending downhole in a wellbore and for retrieving it from the wellbore.

The concentric ring carrier apparatus includes top sub 540, which can be a top sub of another component of a downhole assembly, and carrier sub 520. The body of carrier sub 520 is identified as mandrel 522. The carrier apparatus includes concentric rings around concentric carrier sub 520. In one example, top sub 540 is connected to carrier sub 520 by a thread connection, represented by thread 542.

In one example, system 500 includes four degradable test coupon rings, represented by coupon 550-1, coupon 550-2, coupon 550-3, and coupon 550-4, collectively coupons 550. In one example, top sub 540 holds degradable test coupon rings axially in place when top sub 540 is connected to carrier sub 520. Such rings can be referred to as external rings disposed in external, concentric cavities. In one example, the carrier sub also houses separator rings, represented by separator 530, between each test coupon ring. Separator 530 represents the separation of the different coupons. Coupons 550 are exposed to wellbore environment when housed concentrically about carrier sub 520, because they are on the outside of the carrier body and exposed to the environment the carrier is placed in.

Figure 6:
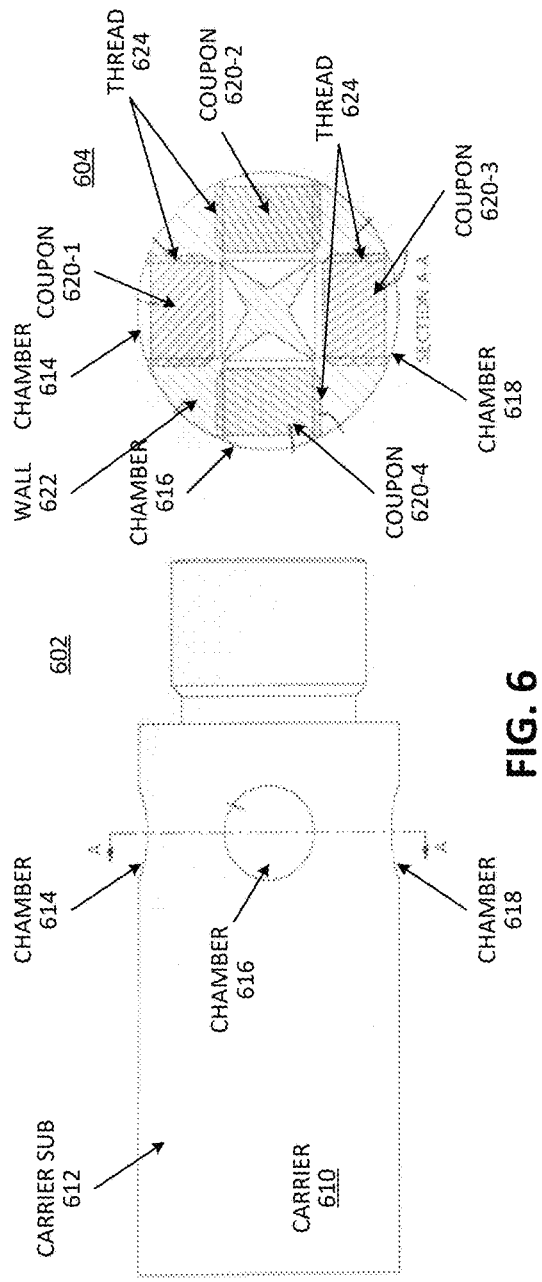
FIG. 6 is an example of a downhole carrier apparatus subassembly with degradable coupons anchored to the exterior of the carrier.

FIG. 6 is an example of a downhole carrier apparatus subassembly with degradable coupons anchored to the exterior of the carrier. System 602 represents a carrier apparatus in accordance with an example of system 100. More specifically, system 602 illustrates a carrier apparatus with external cavities or chambers to anchor convey degradable test coupons to convey into and out of a wellbore environment.

System 602 includes carrier 610, having carrier sub 612, which represents the body of a carrier apparatus. Carrier sub 612 includes chambers around an outside of the sub wall, represented by chamber 614, chamber 616, and chamber 618. It will be understood that more or fewer chambers can be used, for example, there can be more chambers to convey more degradable coupons. With separate chambers, system 602 can convey degradable coupons in separate cavities in to and out of wellbore environments. Each chamber can provide a location to anchor a test coupon that will be exposed to the wellbore environment.

View 604 represents a cross-section looking back at arrows A. In view 604, coupon 620-1, coupon 620-2, coupon 620-3, and coupon 620-4, collectively coupons 620, are visible arranged concentrically around the carrier apparatus, disposed in separate chambers in the sub wall, represented by wall 622. In one example, coupons 620 are anchored to wall 622 in individual chambers through the use of threaded connections, represented by thread 624. Thus, each coupon can be individually threaded into an external cavity to be secured to carrier 610. Coupons 620 are exposed to wellbore environment when anchored to carrier 610, seeing that the chambers are open to the wellbore environment.

Figure 7:
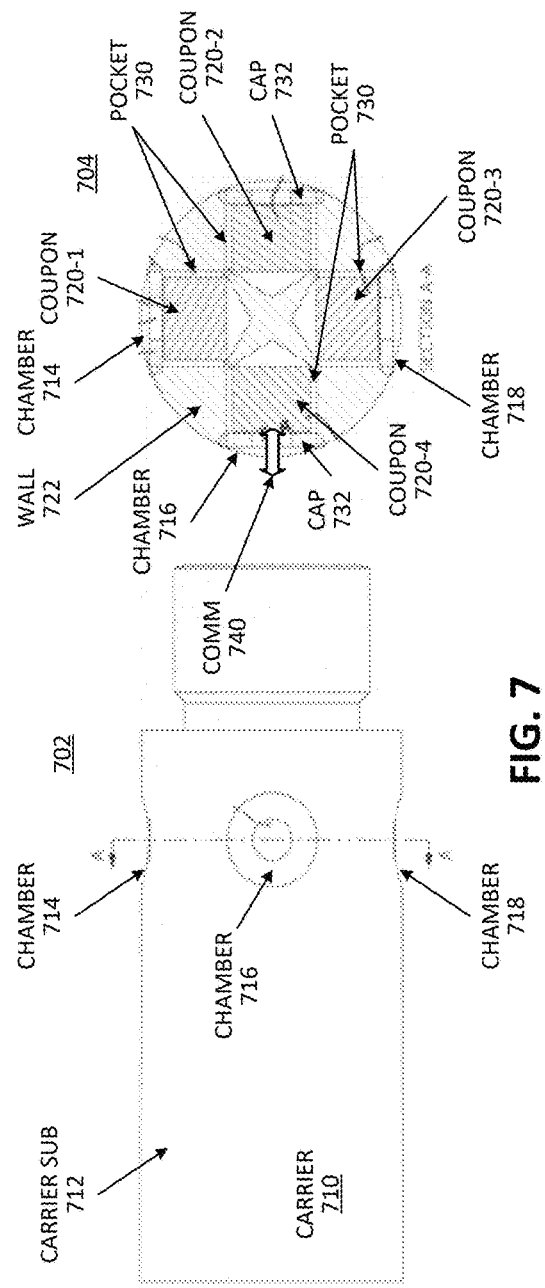
FIG. 7 is an example of a downhole carrier apparatus subassembly with degradable coupons housed in pockets in the sidewall of the carrier.

FIG. 7 is an example of a downhole carrier apparatus subassembly with degradable coupons housed in pockets in the sidewall of the carrier. System 702 represents a carrier apparatus in accordance with an example of system 100. More specifically, system 702 illustrates a carrier apparatus with external cavities or chambers to anchor convey degradable test coupons to convey into and out of a wellbore environment.

System 702 includes carrier 710, having carrier sub 712, which represents the body of a carrier apparatus. Carrier sub 712 includes chambers around an outside of the sub wall, represented by chamber 714, chamber 716, and chamber 718. It will be understood that more or fewer chambers can be used, for example, there can be more chambers to convey more degradable coupons. With separate chambers, system 702 can convey degradable coupons in separate cavities in to and out of wellbore environments. Each chamber can provide a location to anchor a test coupon that will be exposed to the wellbore environment.

View 704 represents a cross-section looking back at arrows A. In view 704, coupon 720-1, coupon 720-2, coupon 720-3, and coupon 720-4, collectively coupons 720, are visible arranged concentrically around the carrier apparatus, disposed in separate chambers in the sub wall, represented by wall 722. In one example, coupons 720 are anchored to wall 722 in individual chambers through the use of caps, represented by cap 732. Thus, each coupon can be individually held in pocket 730, which is an external cavity of carrier 710.

System 702 illustrates that each chamber has a cap (cap 732) and an opening or gap in the cap. The chambers provide pockets 730 for coupons 720. The cap secures the test coupon in place, while the opening exposes the test coupon to the wellbore environment. Coupons 720 are exposed to wellbore environment when anchored to carrier 710, seeing that the chambers are open to the wellbore environment. Comm (communication) 740 represents the environmental communication of the coupons to the wellbore environment through the opening in caps 732.

Figure 8:
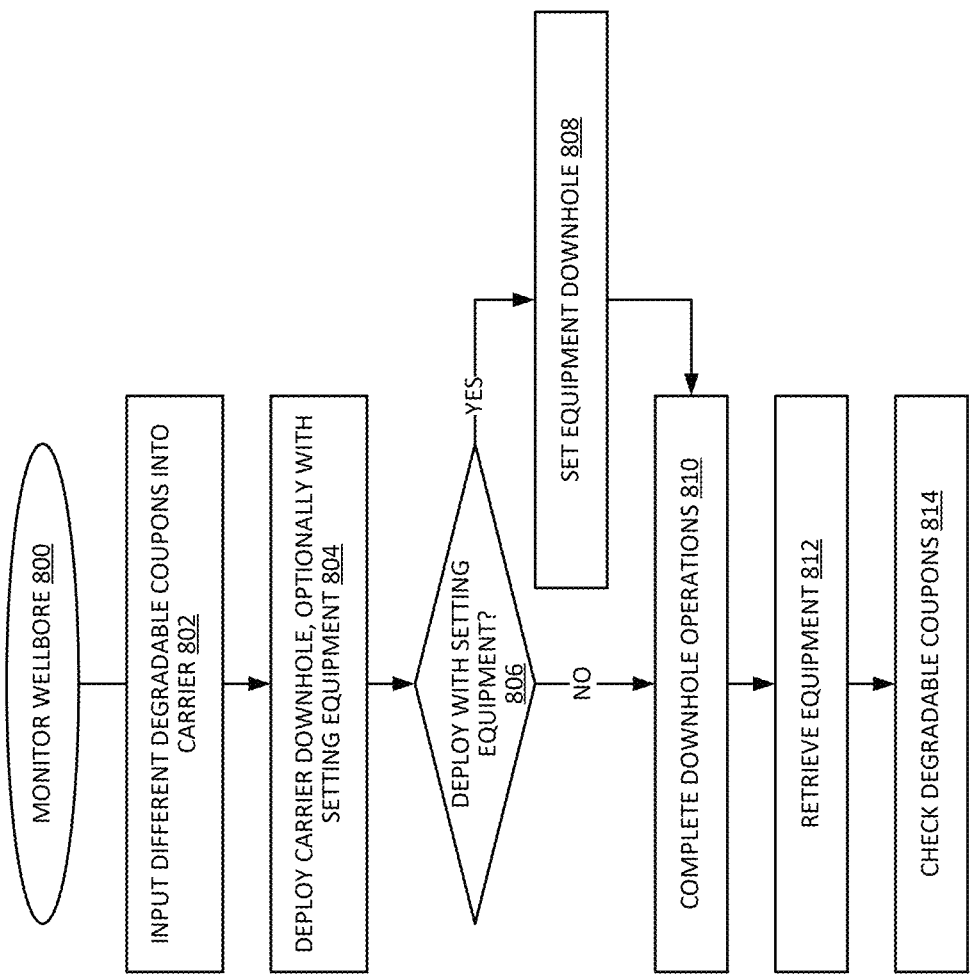
FIG. 8 is a flow diagram of an example of monitoring a wellbore.

FIG. 8 is a flow diagram of an example of monitoring a wellbore. Process 800 represents a processor for monitoring a wellbore environment. Process 800 can be implemented by a system in accordance with an example of system 100.

Someone prepares a carrier apparatus in accordance with any example described herein. In one example, an individual can input different degradable coupons into the carrier, block 802. In one example, the different degradable coupons can have different compositions, different materials, or a combination of different materials and different combinations to degrade at different rates. Degradation at different rates refers to the fact that in the same environment, one coupon will degrade at a different rate than a different coupon. Inputting the coupons can be referred to as setting, mounting, securing, or anchoring the coupons to an appropriate location on or in the carrier, in accordance with any example herein.

A user of the carrier can deploy the carrier downhole, optionally with setting equipment, block 804. Setting equipment can be any equipment used to set a component at a target depth in a wellbore. Alternatively to setting equipment, other equipment can be used to deploy the carrier, such as other completion operations. Completion operations can include deployment of firing guns for a perforator, pumping down a gauge to measure the internal dimension, or other operation that can be performed without setting a component.

If the carrier is deployed with setting equipment, block 806 YES branch, the assembly can set the equipment downhole at the target depth, block 808. The system can complete the downhole operations, block 810, with the setting or with other operations. If the carrier is deployed without setting equipment, block 806 NO branch, the system can perform other operations to complete the downhole operations, block 810.

Once downhole operations are complete, the system can retrieve the equipment, block 812. At the surface, someone can analyze the system, including checking the degradable coupons, block 814. The analysis allows someone to observe the different amounts of degradation of the different materials/compositions. The degradable coupon analysis can indicate the wellbore environment at the target depth and indicate a rate degradation of different compositions/materials. Thus, the system can be set up with the proper degradable components for the desired operation in the wellbore, with current information about the environment in which the degradable components will be deployed.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures of these. Illustrative treatment agents include, but are not limited to, fracturing fluids, acids, steam, water, brine, anti-corrosion agents, cement, permeability modifiers, drilling muds, emulsifiers, tracers, flow improvers, and so forth. Illustrative well operations include, but are not limited to, hydraulic fracturing, stimulation, tracer injection, cleaning, acidizing, steam injection, water flooding, cementing, and so forth.

While preferred materials for elements of the invention (e.g., components) have been described, the apparatuses of the present invention are not limited by these materials. Wood, plastics, fiber reinforced phenolics, fiber reinforced resins, elastomers, foam, metal alloys, sintered metals, ceramics, fiber, or fabric reinforce composites, and other materials may comprise some or all elements of the apparatuses in various implementations.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A wellbore apparatus, comprising:
    a carrier having a carrier cavity and a port to expose the carrier cavity to a wellbore environment at a target depth; and
    multiple coupons made of different degradable materials housed in the carrier cavity, to degrade at different rates in the wellbore environment, where degradation of the multiple coupons indicates a degradation rate of the different degradable materials in the wellbore environment.

2. The wellbore apparatus of claim 1, wherein the carrier cavity comprises a single chamber with the multiple coupons housed in the single chamber.

3. The wellbore apparatus of claim 2, wherein the single chamber comprises a single internal cavity within the carrier.

4. The wellbore apparatus of claim 1, wherein the carrier cavity comprises multiple separate chambers, with the multiple coupons housed in the separate chambers.

5. The wellbore apparatus of claim 4, wherein each separate chamber houses a coupon of different degradable material.

6. The wellbore apparatus of claim 4, wherein the multiple separate chambers comprise individual internal cavities within the carrier.

7. The wellbore apparatus of claim 4, wherein the multiple separate chambers comprise exterior cavities on an exterior of the carrier.

8. The wellbore apparatus of claim 7, wherein the multiple coupons thread into the exterior cavities.

9. The wellbore apparatus of claim 7, wherein the exterior cavities secure the multiple coupons in the exterior cavities with caps.

10. The wellbore apparatus of claim 7, wherein the exterior cavities comprise external grooves for external rings, where each of the multiple coupons is implemented as one of the external rings.

11. The wellbore apparatus of claim 1, further comprising:
    a downhole setting tool coupled to the carrier; and
    a frac plug coupled to the carrier.

12. The wellbore apparatus of claim 1, deployed downhole via wireline conveyance.

13. The wellbore apparatus of claim 1, wherein the carrier comprises a body made from at least one material selected from: metal, composite, elastomer, wood, plastic, or glass.

14. The wellbore apparatus of claim 1, wherein the multiple coupons comprise degradable materials made from different magnesium alloys.

15. The wellbore apparatus of claim 1, wherein the multiple coupons comprise degradable materials made from different polyglycolic acid compositions or different polylactic acid compositions.

16. A method for monitoring a wellbore, comprising:
    setting multiple coupons made of different degradable materials in a carrier cavity of a carrier, the multiple coupons to degrade at different rates in a wellbore environment, where degradation of the multiple coupons indicates a degradation rate of the different degradable materials in the wellbore environment;
    deploying the carrier to a target depth in the wellbore; and
    retrieving the carrier from the wellbore to observe the degradation of the multiple coupons.

17. The method of claim 16, wherein the carrier cavity comprises a single chamber with the multiple coupons housed in the single chamber.

18. The method of claim 16, wherein the carrier cavity comprises multiple separate chambers, with the multiple coupons housed in the separate chambers.

19. The method of claim 16, wherein deploying the carrier comprises:
    deploying the carrier with a downhole setting tool coupled to the carrier and a frac plug coupled to the carrier.

20. The method of claim 16, wherein the multiple coupons comprise degradable materials made from one or more of: different magnesium alloys, different polyglycolic acid compositions, or different polylactic acid compositions.

\* \* \* \* \*